(12) United States Patent
Ding

(10) Patent No.: US 6,430,663 B1
(45) Date of Patent: Aug. 6, 2002

(54) METHODS FOR SELECTING A BOOT PARTITION AND HIDING A NON-SELECTED PARTITION

(75) Inventor: Yafu J. Ding, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/568,087

(22) Filed: May 9, 2000

Related U.S. Application Data

(63) Continuation-in-part of application No. 09/256,687, filed on Feb. 23, 1999, which is a continuation-in-part of application No. 09/110,783, filed on Jul. 6, 1998.

(51) Int. Cl.[7] .............................................. G06F 12/00
(52) U.S. Cl. ........................... 711/162; 711/173; 713/2; 714/6
(58) Field of Search .................................. 711/162, 173; 713/1–2; 714/6, 23; 717/11

(56) References Cited

U.S. PATENT DOCUMENTS

| | | | |
|---|---|---|---|
| 5,136,711 A | * | 8/1992 | Hugard et al. ................. 713/2 |
| 5,519,870 A | * | 5/1996 | Kannan et al. ................ 713/2 |
| 5,764,593 A | * | 6/1998 | Turpin et al. .................. 713/2 |
| 5,787,491 A | * | 7/1998 | Merkin et al. ............... 711/173 |
| 5,944,820 A | * | 8/1999 | Beelitz .......................... 713/1 |
| 5,956,475 A | * | 9/1999 | Burckhartt et al. ........... 714/23 |
| 6,052,781 A | * | 4/2000 | Weber ......................... 713/200 |

* cited by examiner

Primary Examiner—Do Hyun Yoo
Assistant Examiner—Nasser Moazzami
(74) Attorney, Agent, or Firm—Martine & Penilla, LLP

(57) ABSTRACT

Methods for selecting a boot partition from a single drive of a computer are disclosed. In one example, a method includes receiving a boot request and accessing a signature sector of the single drive to ascertain a first serial number for a first boot partition and a second serial number for a second boot partition. The method then proceeds to scanning the single drive to identify the first boot partition using the first serial number and identify the second boot partition using the second serial number. A selection window requesting user selection of either the first boot partition or the second boot partition is then generated. The method then proceeds to modifying a boot flag of the single drive in response to the user selection, and the modifying of the boot flag is configured to identify one of the first boot partition and the second boot partition as a partition containing an operating system for booting the computer. In accordance with this example, the method further includes hiding a non-selected partition.

14 Claims, 8 Drawing Sheets

If you are unable to boot from your original drive, select the Rezoom drive.

Select Original drive: Press <1> <enter>

Select Rezoom drive: Press <2> <enter>

METHODS FOR SELECTING A BOOT PARTITION AND HIDING A NON-SELECTED PARTITION

CLAIM OF PRIORITY

This application is a continuation-in-part of, and claims priority under 35 U.S.C. §120 from, pending U.S. patent application Ser. No. 09/256,687, filed Feb. 23, 1999, entitled "Method for Managing Primary and Secondary Storage Devices in an Intelligent Backup and Restoring System," which is a continuation-in-part of U.S. patent application Ser. No. 09/110,783, filed Jul. 6, 1998, entitled "An Intelligent Backup And Restoring System And Method For Implementing The Same." The disclosures of these pending applications are incorporated herein by reference for all purposes.

CROSS REFERENCE TO RELATED APPLICATIONS

This application is related to the following applications: (1) U.S. patent application Ser. No. 09/110,783, filed Jul. 6, 1998 now U.S. Pat. No. 6,205,527, and entitled "An Intelligent Backup And Restoring System And Method For Implementing The Same"; (2) U.S. patent application Ser. No. 09/256,680, filed on Feb. 23, 1999, and entitled "Method of Finding Application Components in an Intelligent Backup and Restoring System"; (3) U.S. patent application Ser. No. 09/256,676, filed on Feb. 23, 1999, and entitled "Method of Generating A Database for use in an Intelligent Backup and Restoring System"; (4) U.S. patent application Ser. No. 09/256,686, filed on Feb. 23, 1999, and entitled "Method for Generating a Footprint Image File for an Intelligent Backup and Restoring System"; (5) U.S. patent application Ser. No. 09/256,682, filed on Feb. 23, 1999, and entitled "Automated Drive Repair Systems and Methods"; and (6) U.S. patent application Ser. No. 09/256,601 now U.S. Pat. No. 6,289,426, filed on Feb. 23, 1999, and entitled "Drive Preparation Methods for Intelligent Backup Systems." This application is further related to U.S. patent application Ser. No. 09/566,910, filed on the same day as the instant application, and entitled "Method for Protecting Data of a Computer System," and U.S. patent application Ser. No. 09/568,564, filed on the same day as the instant application, and entitled "Method for Creating a Partition on the Fly." Each of these related applications is incorporated herein by reference.

BACKGROUND OF THE INVENTION

1. Field of the Invention

This invention relates generally to computer systems, and more particularly to booting processes associated with a drive of a computer and methods for booting to a selected partition of the drive.

2. Description of the Related Art

Computer systems commonly have a hard disk drive on which an operating system (OS) is stored. The OS, as is well known, provides the necessary functionality to enable processing of basic computer routines as well as render software applications with specific OS functionality. Although the OS is designed to be robust, many times errors occur that cause the OS to stop functioning as intended. This type of problem is often referred to as a computer crash, and the computer crash can be the result of any number or reasons. Such reasons include, for example, computer viruses, miscommunication between programs, improper shutdowns, power surges, etc. In any even, when such a crash occurs, the computer system may not be able to reboot from the resident OS.

When such crashes occur, the computer user is generally required obtain professional help in order to diagnose the problem and then attempt a solution. Since computer users often store valuable information on their drive, users are routinely forced to attend to many hours of down-time until the drive is repaired and data is recovered (assuming a prior backup was recent enough to be of help).

In view of the foregoing, there is a need for methods that enable computer systems to remain operational from the same hard disk drive while repairs are made to the original OS.

SUMMARY OF THE INVENTION

Broadly speaking, the present invention fills these needs by providing methods that enable booting from a copy operating system (OS) stored in a different partition so a single hard disk drive can have two copies of OS in different partitions to be selected to boot from. In a preferred embodiment, a single hard disk drive is provided with at least two partitions. An original OS is provided in one of the partitions and a copy OS is provided in another partition. In order to keep the OS functioning under one same circumstance, only one OS partition should be seen at a time. When the computer system is operational using the original OS, e.g., using an original boot partition, the partition having the copy OS is not visible to the computer user. When the computer is rebooted using the copy OS, e.g., using a Rezoom partition, the original boot partition will not be visible to the computer user. Thus, the user can continue to work uninterrupted using the Rezoom partition as if the Rezoom partition were the original boot partition. It should be appreciated that the present invention can be implemented in numerous ways, including as a process, an apparatus, a system, a device, a method, or a computer readable medium. Several inventive embodiments of the present invention are described below.

In one embodiment, a method for selecting a boot partition from a single drive of a computer is disclosed. The method includes receiving a boot request and accessing a signature sector of the single drive to ascertain a first serial number for a first boot partition and a second serial number for a second boot partition. The method then proceeds to scanning the single drive to identify the first boot partition by the first serial number and identify the second boot partition by the second serial number. A selection window requesting user selection of either the first boot partition or the second boot partition is then generated. The method then proceeds to modifying a boot flag in the partition table of the single drive in response to the user selection, and the modifying of the boot flag is configured to identify one of the two OS partitions as a partition containing an operating system for booting the computer. In a preferred implementation, the method further includes hiding a non-selected partition. The non-selected partition is one of the first boot partition and the second boot partition.

In another embodiment, a method for hiding a partition of a single drive connected to a computer is disclosed. The method includes writing a master boot record (MBR) having a boot select code to the single drive. A signature sector (SS) is then written to the single drive. The signature sector having a first serial number for an original boot partition and a second serial number for a backup boot partition. Then, one of the first serial number and the second serial number is written to an active partition field of the signature sector. The serial number to be written to the active partition field defining a user selected boot partition which can be one of the original boot partition and the backup boot partition. The method then includes booting to the user selected boot partition, and the booting is configured to hide one of the original boot partition and the backup partition which is not the user selected boot partition.

In yet a further embodiment, a computer readable media having program instructions for selecting a boot partition from a single drive of a computer is disclosed. The computer readable media includes: (a) program instructions for receiving a boot request; (b) program instructions for accessing a signature sector of the single drive to ascertain a first serial number for a first boot partition and a second serial number for a second boot partition; (c) program instructions for scanning the single drive to identify the first boot partition by the first serial number and identify the second boot partition by the second serial number; (d) program instructions for generating a selection window requesting user selection of either the first boot partition or the second boot partition; and (e) program instructions for modifying a boot flag of the single drive in response to the user selection. The modifying of the boot flag is configured to identify one of the first boot partition and the second boot partition as a partition containing an operating system for booting the computer.

The advantages of the present invention are numerous. Most notably, the ability to boot form another partition of the same hard disk drive provides users with the ability to continue working uninterrupted after a failure to, for example, the OS stored in the original boot partition. Yet another advantage is that users will be presented with a seamless appearance of the drive letter arrangement. For instance, if the partition having a copy of the OS (e.g., the Rezoom partition) is not being used to run the computer, it is hidden from the user's view and all drive letters are presented in proper sequential order after the hiding. In the same manner, if the Rezoom partition is running the computer, the original partition containing the failed OS will be hidden from the user's view when the computer is in use. In this case, the original boot partition will be hidden and the drive letter of the original boot partition (e.g., C) will be assigned to the Rezoom partition. Thus, the ability to select boot partitions, the hiding of non-selected partitions and drive letter mapping provide a powerful solution that will enable busy people to continue working uninterrupted by a computer failure. Such failures can then be addressed at a later time.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Methods are provided to enable booting from a copy operating system (OS) stored in a different partition from the original OS, so a single hard disk drive can have two copies of the OS in different partitions to be selected to boot from. In a preferred embodiment, a single hard disk drive is provided with at least two partitions. Other partitions in addition to the two can be provided, for example, for storing programs and data. An original OS is provided in one of the partitions and a copy OS is provided in another partition. In order to make the OS work as one same configuration, when the computer system is operational using the original OS, e.g., using an original boot partition of the hard disk drive, the partition having the copy OS is not visible to the computer user. When the computer is operational using the copy OS, e.g., using a Rezoom partition, the original boot partition will not be visible to the computer user. Thus, after a crash or malfunction, the user can continue to work uninterrupted by rebooting to the Rezoom partition as if the Rezoom partition were the original boot partition. In functionality and appearance, the Rezoom partition will appear to the user as did the original boot partition. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
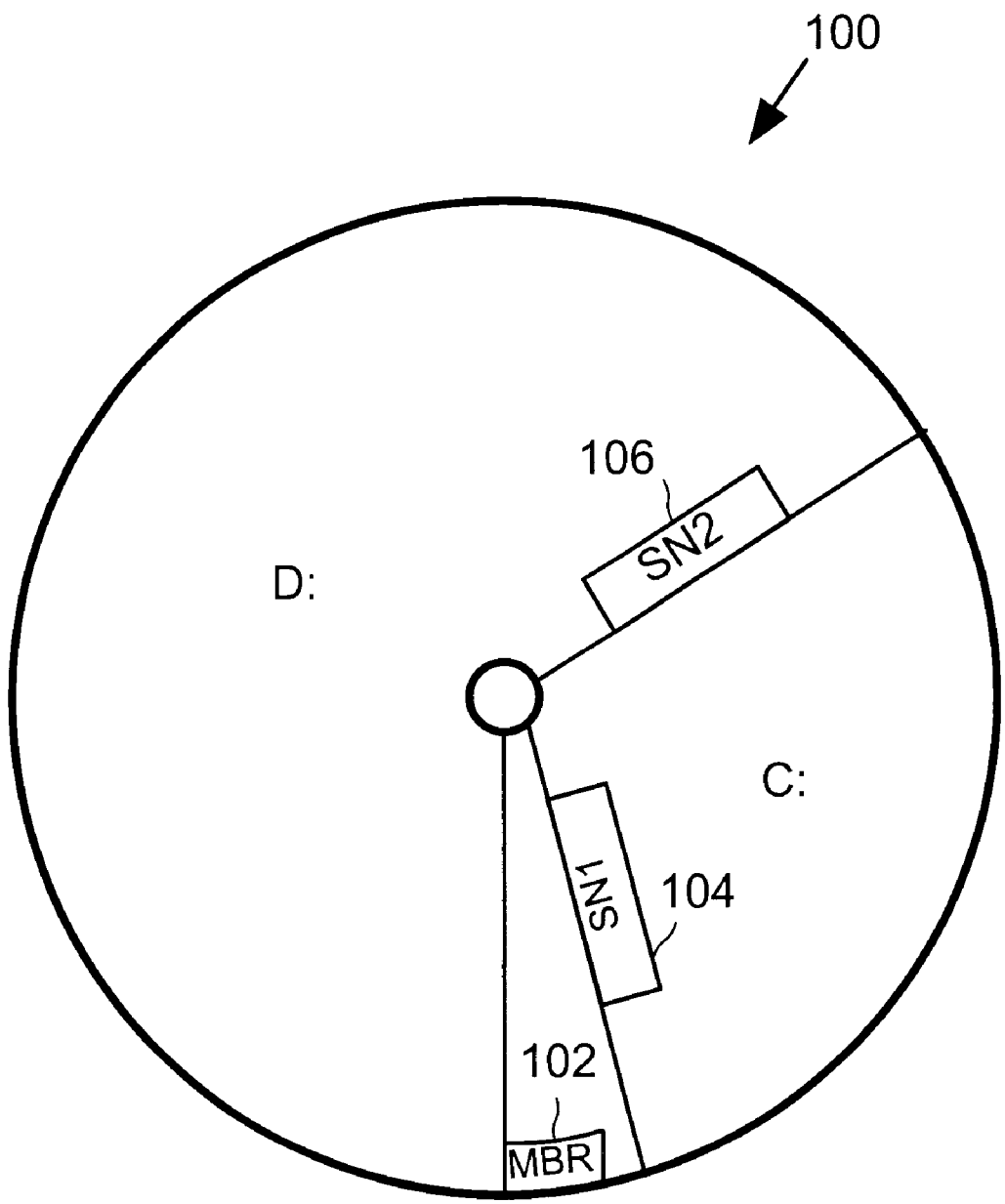
FIG. 1 is a pictorial representation of a single drive having a C: partition and a D: partition.

FIG. 1 is a pictorial representation of a single drive 100 having a C: partition and a D: partition. Each of the partitions C: and D: is shown including its associated serial numbers SN1 104 and SN2 106. Also a part of the single drive 100 is the portion which is not part of neither the C: partition nor the D: partition. As is well known, a master boot record (MBR) 102 is stored on this portion of the drive. The MBR 102 is generally stored in a first sector (e.g., 512 bytes in size) of the drive and contains information as to how and where an operating system is located so that it can be booted (loaded) into the computer's main storage (e.g., RAM). For instance, the MBR will contain code that defines partition C: as having the bootable OS by way of the serial number SN1 104.

Figure 2A:
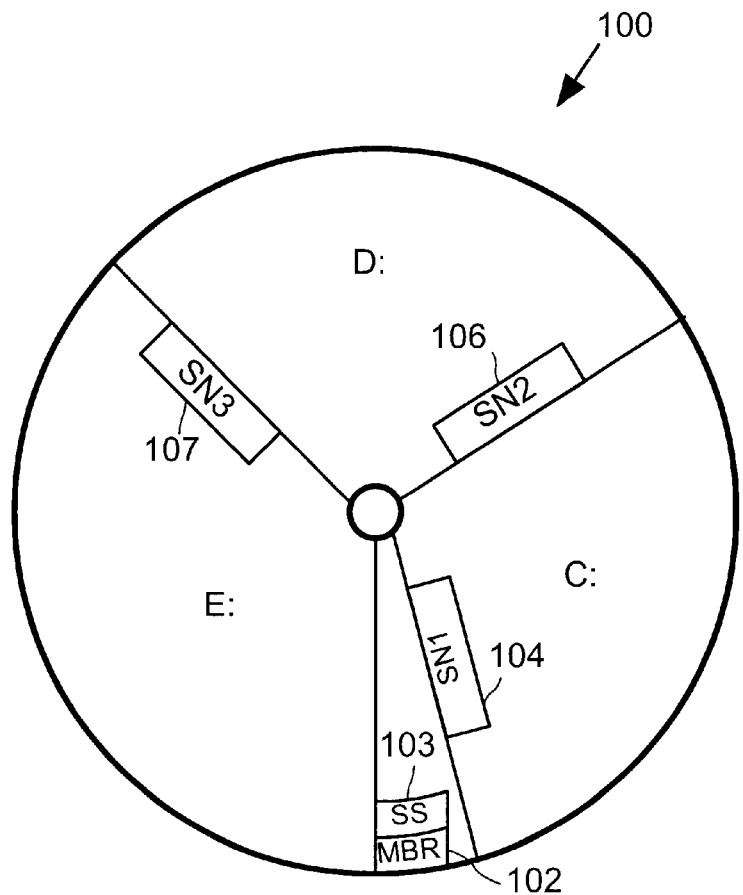
FIG. 2A is a pictorial representation of a single drive having multiple partitions, an MBR, and a signature sector, in accordance with one embodiment of the present invention.

In one embodiment, the single drive 100 can be initially formatted to include partitions C:, D: and E: as shown in FIG. 2A. During this formatting, a signature sector (SS) 103 is written to a sector as is the MBR 102. In this example, partition E: also includes its own serial number SN3 107. The MBR 102 is preferably modified to include modified boot select code. The boot select code is configured to be triggered by the MBR code in order to verify which sector was selected for booting. In accordance with this invention, it is possible to boot from an OS present in more than one sector. For example, the original OS may be loaded in partition C:, which we will refer to as the original boot partition. The single drive 100 will also, in accordance with the present invention, include a copy OS (and all associated files to make the OS a fully operational copy) on anther partition. The other partition can be, for example, partition E:. Thus, in the preferred embodiment, when the system is operating from the original boot partition, partition E: will not be visible to the user.

Figure 2B:
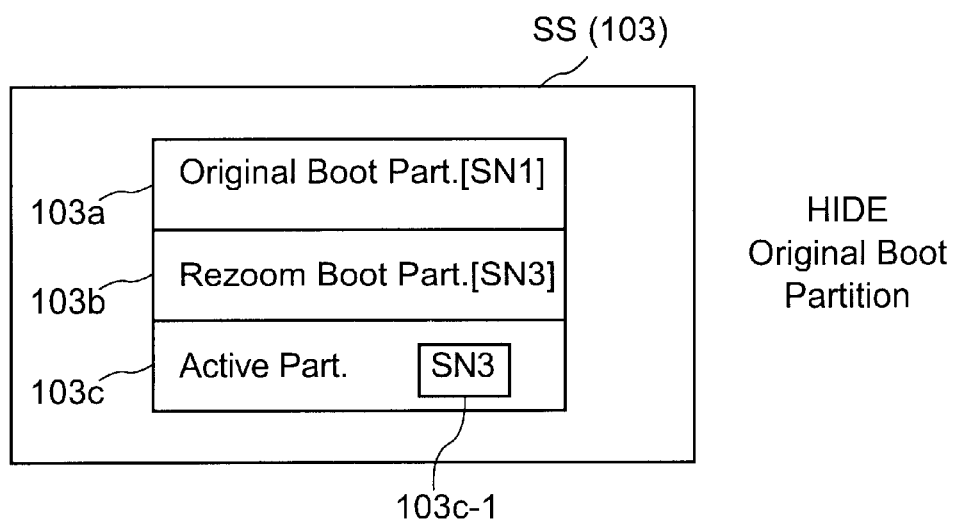
FIGS. 2B and 2C illustrate in greater detail the contents of a signature sector that is to be written to the single drive, in accordance with one embodiment of the present invention.

Referring again to the boot select code, the boot select code is configured to refer to the SS 103 to ascertain which partition will become the boot partition. As shown in FIG. 2B, the SS 103 is shown including a plurality of fields including an original boot partition field 103a, a Rezoom boot partition field 103b, and an active partition 103c. Prior to boot up of the OS, and as the boot select code of the MBR 102 references SS103, the active partition field 103c will be read to ascertain which partition was selected by the user to be the active partition (i.e., which will be the boot partition). In the example shown in FIG. 2B, the user has selected serial number SN3 107 as the active partition. The active partition is defined as a partition containing an operating system (OS) that can be used to boot the computer. In this example, partition E: as shown in FIG. 2A is designated as the active partition, and therefore, the original boot partition defined by serial number SN1 104 will be hidden from the user during operation from the Rezoom boot partition defined by field 103b in SS103.

Figure 2C:
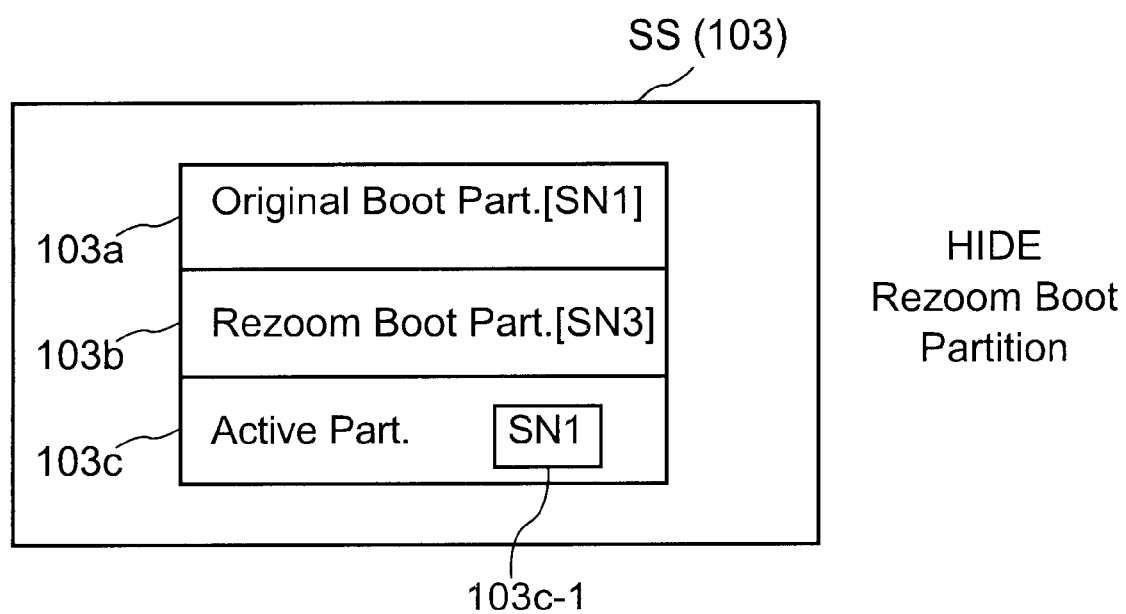

FIG. 2C shows an alternative embodiment in which the user has selected the original boot partition having serial number SN1 104 as the active partition. To signify that the original boot partition shown as partition C: in FIG. 2A is the active partition, the serial number SN1 will be written by the boot select code to a sub-field 103c-1 as was the case in FIG. 2B when SN3 was written to sub-field 103c-1. In the case where the original boot partition is selected to be the active partition, the method of the present invention is configured to hide the Rezoom boot partition from the user during normal operation. That is, although a partition E: exists on the single drive 100, during operation the user will only see partition C: and partition D:. This is in contrast to the example of FIG. 2B in which partition E:, which is defined as the Rezoom partition was selected to be the active partition. In that case, the Rezoom partition, which is shown as partition E: in FIG. 2A, would be presented to the user as partition C:. At the same time, the user would not be able to view the original C: partition.

Figure 3A:
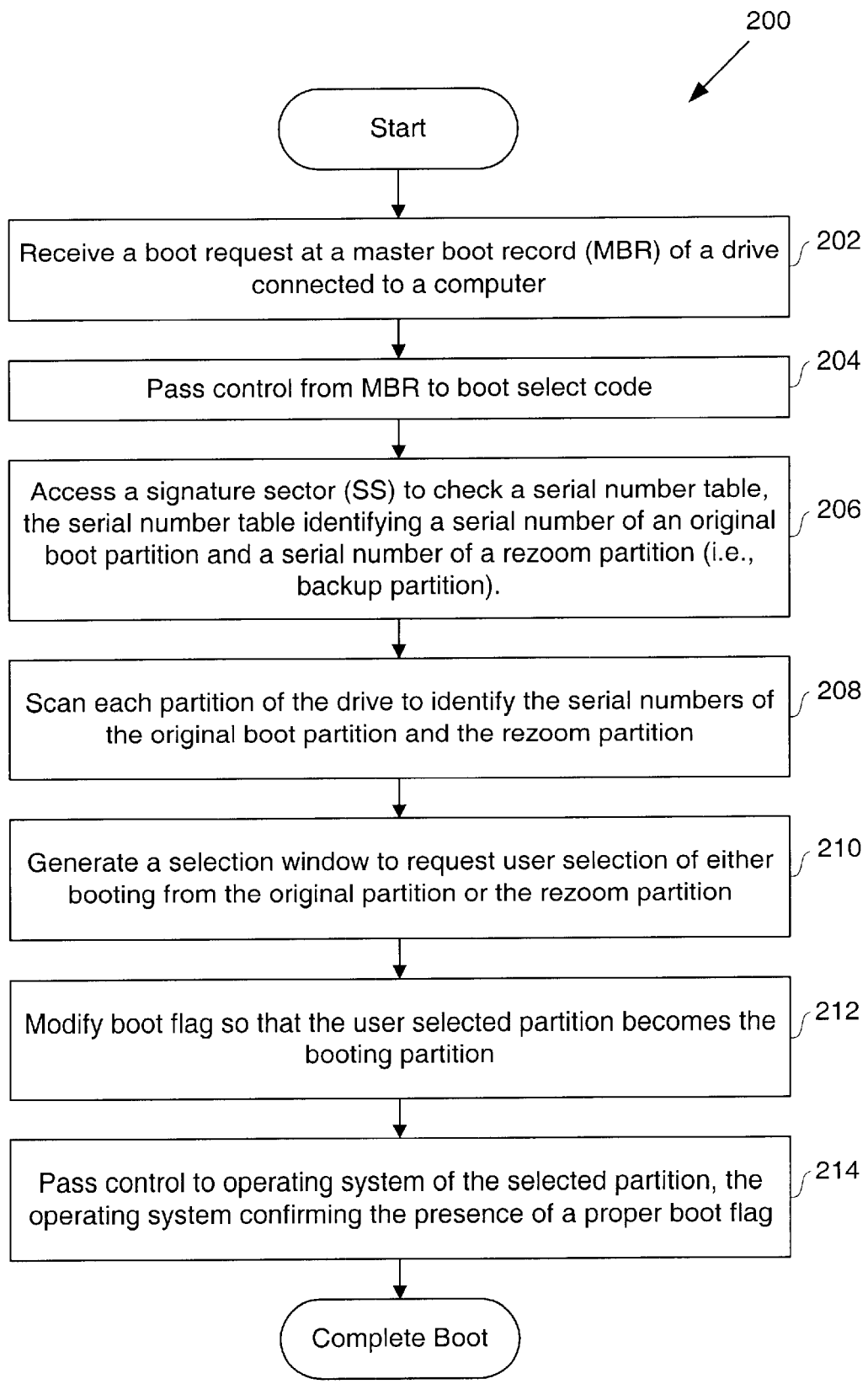
FIG. 3A shows a flowchart diagram defining the method operations performed in order to provide boot select capabilities from different partitions, in accordance with one embodiment of the present invention.

FIG. 3A shows a flowchart diagram 200 defining the method operations performed in order to provide boot select capabilities from different partitions, in accordance with one embodiment of the present invention. The method begins at an operation 202 where a boot request is received at a master boot record (MBR) of a drive connected to a computer. Once the request is received by the MBR, the method moves to operation 204 where control is passed from the MBR to the boot select code. As mentioned above, the boot select code is configured to be part of the MBR code. In one embodiment, the boot select code will be integrated within the same sector as is the MBR. In an alternative embodiment, the boot select code can be written to other sectors after the MBR sector depending upon the size of the boot select code and desire functionality. In still another embodiment, the boot select code can be referred to as an Adaptec Boot Select (ABS) code. For more information on boot select codes and modifications to MBR code, reference can be made to co-pending U.S. patent application Ser. No. 09/302,921, entitled "Hard Disk Bootstrap Redirection," which is hereby incorporated by reference.

The boot select code is then configured to access a signature sector (SS) 103 in operation 206. The access is configured to check a serial number table in the SS 103. In one embodiment, the SS 103 includes three fields, such as fields 103a, 103b and 103c. The serial number table is configured to identify a serial number of an original boot partition and a serial number of a Rezoom partition (i.e., a backup partition). As mentioned above, the Rezoom partition simply holds a copy of the operating system and all other files necessary to make the Rezoom partition a fully operational boot partition. Also, it should be noted that when the computer is booted using the original boot partition, the user will not be able to see the Rezoom partition. In the same manner, when a user decides to boot from the Rezoom partition, the Rezoom partition will appear as if it were the original boot partition (including having the same partition drive letter), and thus, the original partition will not be viewable nor accessible by the user.

The method now proceeds from operation 206 to operation 208 where each partition of the drive is scanned to identify the serial numbers of the original boot partition and the Rezoom partition. In this embodiment, the boot select code is the agent by which the scanning of the drive is performed. The boot select code is also configured to generate a selection window in operation 210 from which to request a user selection of either booting from the original partition or the Rezoom partition.

Figure 3B:
FIG. 3B illustrates a boot selection window (which can be text or a GUI), in accordance with one embodiment of the present invention.
Figure 3B:
Figure 3B:

This selection window is shown in greater detail in FIG. 3B, which is identified as a boot partition selection 250. The boot partition selection 250 can also be done by way of a graphical user interface (GUI). As shown therein, the boot partition selection 250 window may ask the user "If you are unable to boot from your original drive, select the Rezoom drive." From this boot partition selection 250, the user may select the original drive 250a by pressing 1 and then enter, or the user may select the Rezoom drive by pressing 2 and then enter. It should be noted that the actual keystroke or number entered into the boot partition selection can be any number or key or can be by way of a mouse or other data input mechanism. Thus, the actual text or key functions entered by way of the boot partition selection 250 can be configured in any way to enable selection of either one of the original drive or the Rezoom drive from which to boot.

Referring back to FIG. 3A, the method then continues to operation 212 where a boot flag is modified so that the user-selected partition will become the boot partition. As is well known, the original boot partition is generally provided with a boot flag so that standard operating systems will confirm that the particular partition is the proper partition from which booting should be performed. Accordingly, if the user selects the original drive to be the boot partition, then the boot flag will be configured such that the original drive will have the proper boot flag that is indicative of it being the boot partition. All other partitions will also be appropriately modified so that they are not defined as the booting partition. In the alternative, if the user selects the Rezoom drive, the Rezoom drive partition (e.g., partition E: of FIG. 2A) will be defined as the booting partition by adjusting its boot flag to indicate that it is the proper boot partition. At the same time, the original drive partition will be modified to define it as not being the proper boot partition.

Once the boot flag partition has been modified in operation 212, the method will move to operation 214 where control is passed to the operating system of the selected partition. The operating system will confirm the presence of the proper boot flag and complete the boot operation.

Figure 4:
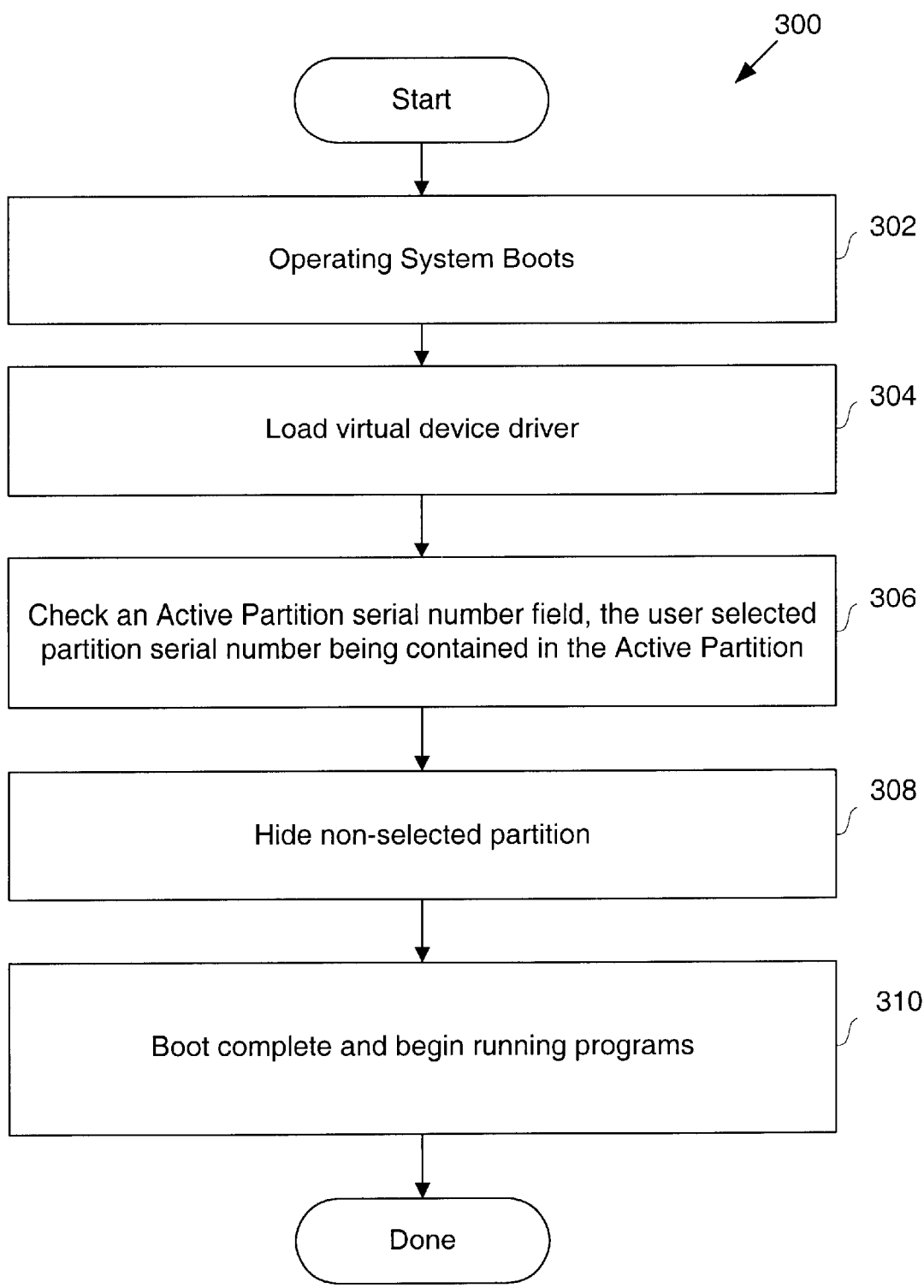
FIG. 4 illustrates a flowchart diagram defining the method operations performed in hiding one of the partitions, in accordance with one embodiment of the present invention.

FIG. 4 illustrates a flowchart diagram 300 defining the method operations performed in hiding one of the partitions, in accordance with one embodiment of the present invention. The method begins at an operation 302 where the operating system boots. Upon booting, the method proceeds to an operation 304 where a virtual device driver is loaded by the operating system. The virtual device driver, in one embodiment, is a kernel mode driver. The virtual device driver is then configured in operation 306 to check an active partition serial number field. The active partition serial number field, as shown in FIGS. 2B and 2C will contain the serial number of the partition which was selected by the user to be the active partition.

For instance, if the user selected the original drive partition to be the active partition (in response to a selection by the user), the serial number for that selected partition will be written to the sub-field 103c-1. In this manner, the virtual device driver will refer to that sub-field in the active partition to determine which partition was the selected user partition. At this point, the method will proceed to an operation 308 where the non-selected partition is hidden. The hiding of the partition is such that if the user selected the original drive to be the active partition, then the Rezoom partition (e.g., partition E: of FIG. 2A) will not be viewable by the user. As such the original boot partition (partition driver letter C:) will be viewed by the user as the active boot partition.

Alternatively, if the user selected the Rezoom partition to be the active partition, the original boot partition would be hidden from the user, and the drive letter partition C: will be assigned to the Rezoom partition. In other words, the user viewing the available partitions of the computer system will view drive partitions C: and D: in either case. Once the non-selected partition is hidden in operation 308, the method will proceed to operation 310 where the booting is completed and programs can be run in a normal manner.

Figure 5:
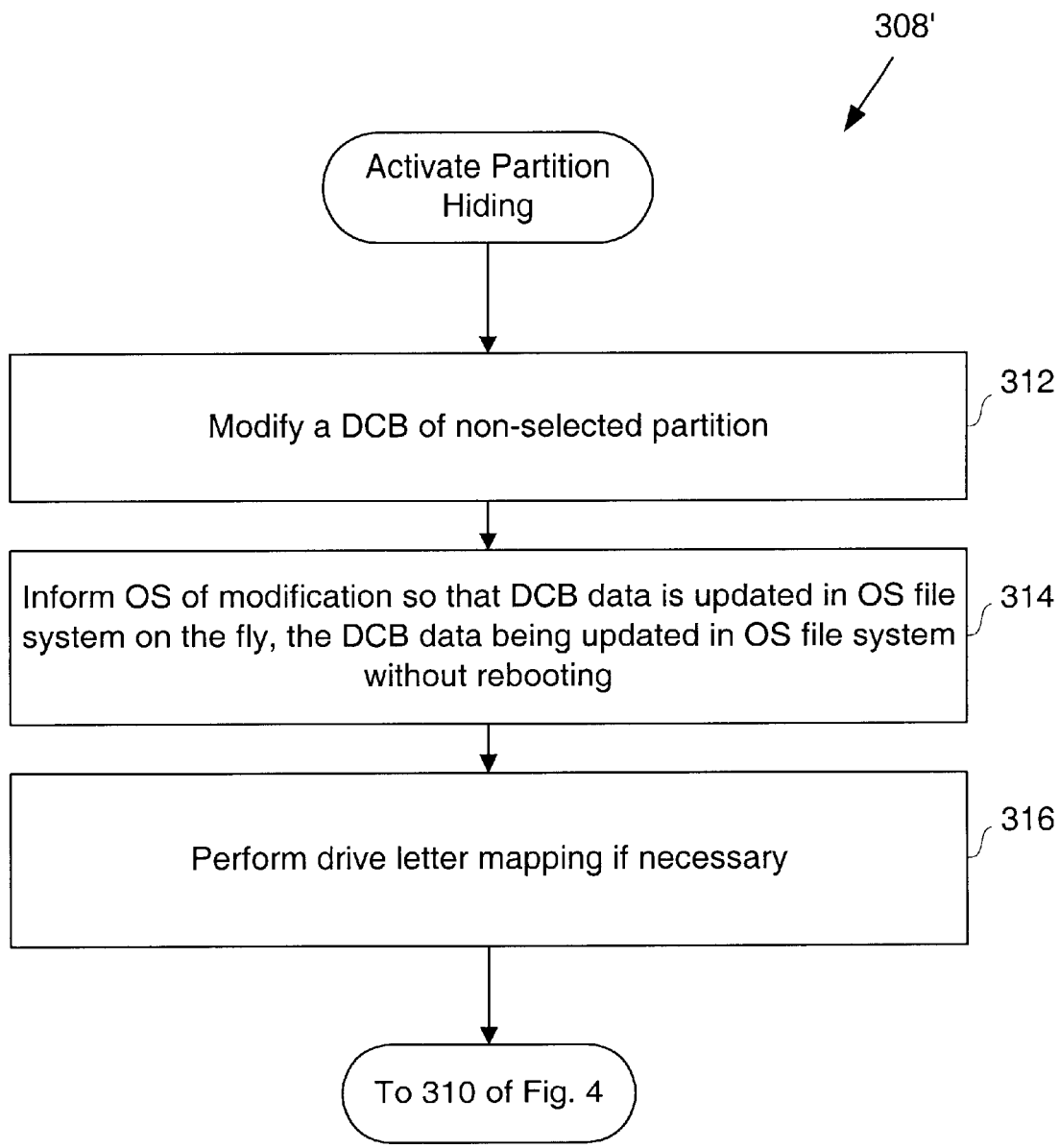
FIG. 5 illustrates a flowchart diagram describing the hiding of a partition, in accordane with one embodiment of the present invention.

FIG. 5 illustrates a flowchart diagram 308' describing the hiding of a partition, in accordane with one embodiment of the present invention. As shown, the method begins at an operation 312 where a drive control block (DCB) of the non-selected partition is modified. In one implementation, the modification of the DCB is such that a drive letter field data in the DCB data structure is erased. A DCB data structure is well known to those skilled in the art. An exemplary DCB data structure can be obtained from, for example, Microsoft Corporation of Redmond, Wash.

Upon completing the modification, the method moves to operation 314 where the operating system (OS) in the selected partition is informed of the modification so that the DCB data can be updated in the OS file system. The updating, in one embodiment, essentially causes a refresh of the drive partition table information. This refresh therefore occurs without having to reboot the computer system. For more information on DCB modification, reference can be made to co-pending U.S. patent application Ser. No. 009/281,596 entitled "Method and Apparatus for Creating Logical DCB On-the-Fly," having inventor Yafu J. Ding, and is herein incorporated by reference. Once the DCB data has been modified, drive letter mapping is performed if necessary in operations 316. In general, the mapping of drive letters is performed so that the hidden partition does not offset a sequential drive letter order. The method now moves back to operation 310 of FIG. 4.

Figure 6A:
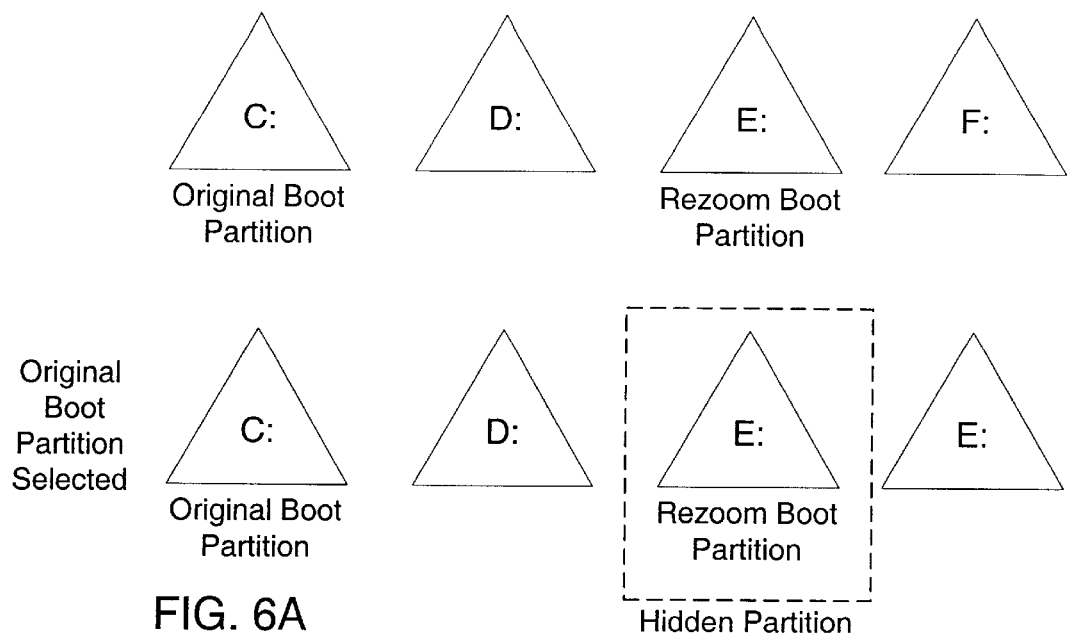
FIGS. 6A and 6B illustrate exemplary drive letter mapping performed in response to the desired user selection, in accordane with one embodiment of the present invention.
Figure 6B:
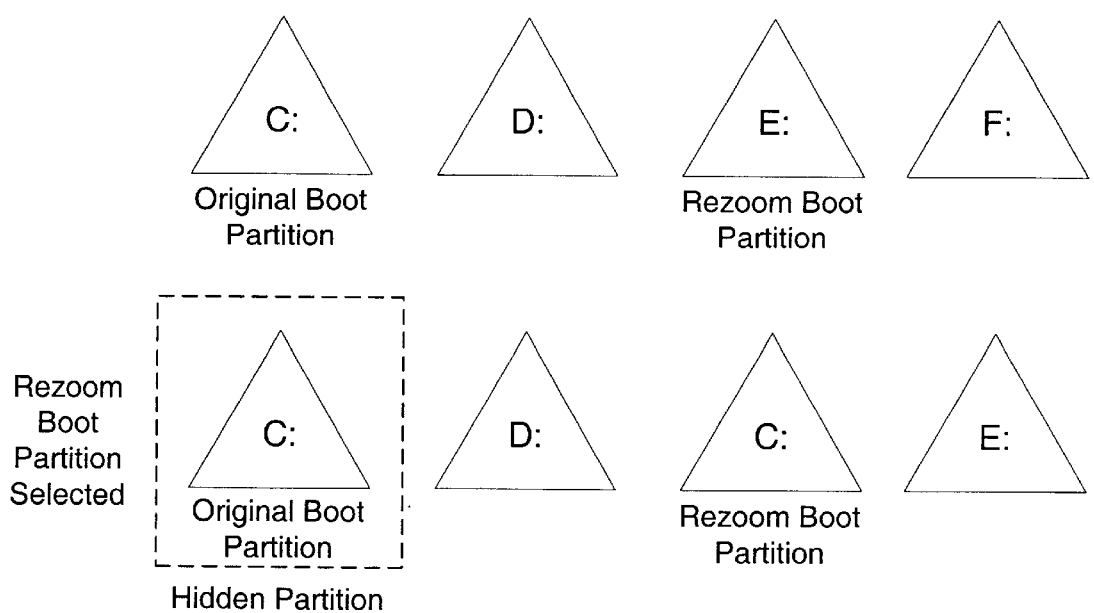

FIGS. 6A and 6B illustrate exemplary drive letter mapping performed in response to the desired user selection. For example, if a drive has partitions C:, D:, E:, and F:, the original boot partition can be C: and the Rezoom partition can be E:. If the user selects the original boot partition as the boot partition, the Rezoom partition E: will be hidden. The hiding of E: therefore requires that drive letter F: be mapped to E:.

Likewise, if the Rezoom partition E: is selected as the boot partition, then the original boot partition C: will be hidden. To keep the look and feel the same for the user, the Rezoom partition E: will be mapped to C:. Therefore, to the user, it is transparent as to which partition is actually being used to boot. This is important in cases where the original boot partition C: were to crash and the user desires to keep working. In such a case, the user can simply select to boot from the Rezoom partition. To the use, since the data will be stored in the D: partition or another any other location, the system will simply boot up flawlessly. Thus user can therefore continue to work uninterrupted and address the failure at a later time. Most importantly, the user's operation will not be affected in terms of learning how the drive partitions are arranged since they will preferably appear the same in either case.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium hard disk drives, removal media, read-only memory, random-access memory, CD-ROMs, CD-Rs, CD-RWs, magnetic tapes, and other data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for selecting a boot partition from a single drive of a computer, comprising:

receiving a boot request;

accessing a signature sector of the single drive to ascertain a first serial number for a first boot partition and a second serial number for a second boot partition;

scanning the single drive to identify the first boot partition using the first serial number and identify the second boot partition using the second serial number;

generating a selection window requesting user selection of either the first boot partition or the second boot partition;

modifying a boot flag of the single drive in response to the user selection, the modifying of the boot flag being configured to identify one of the first boot partition and the second boot partition as a partition containing an operating system for booting the computer;

hiding a non-selected partition, the non-selected partition being one of the first boot partition and the second boot partition; and modifying a drive control block (DCB) of the non-selected partition to prevent display of a drive letter for the non-selected partition.

2. A method for selecting a boot partition from a single drive of a computer as recited in claim 1, further comprising:

mapping drive letters of the single drive to change a second drive letter of the second boot partition to a first drive letter associated with the first boot partition, the mapping occurring when the second boot partition is selected as the partition containing the operating system for booting the computer.

3. A method for selecting a boot partition from a single drive of a computer as recited in claim 1, further comprising:

mapping drive letters of the single drive to change a first drive letter of the first boot partition to a second drive letter associated with the second boot partition, the mapping occurring when the first boot partition is selected as the partition containing the operating system for booting the computer.

4. A method for selecting a boot partition from a single drive of a computer as recited in claim 1, wherein the hiding of the non-selected partition further includes, loading a virtual device driver, the virtual device driver being configured to reference a user selected partition serial number.

5. A method for selecting a boot partition from a single drive of a computer as recited in claim 1, further comprising:

informing the operating system of the modification to the drive control block (DCB) without rebooting the computer.

6. A method for hiding a partition of a single drive connected to a computer, comprising:

writing a master boot record (MBR) having a boot select code to the single drive;

writing a signature sector (SS) to the single drive, the signature sector having a first serial number for an original boot partition and a second serial number for a backup boot partition;

writing one of the first serial number and the second serial number to an active partition field of the signature sector, the serial number to be written to the active partition field defining a user selected boot partition which can be one of the original boot partition and the backup boot partition; and booting to the user selected boot partition, the booting being configured to hide one of the original boot partition and the backup partition which is not the user selected boot partition;

restarting the computer from an operating system of the user selected boot partition;

loading a virtual device driver, the virtual device driver being configured to reference a user selected partition serial number in the signature sector; and modifying a drive control block (DCB) of one of the original boot partition and the backup partition which is not the user selected boot partition.

7. A method for hiding a partition of a single drive connected to a computer as recited in claim 6, further comprising:

restarting the computer from an operating system of the user selected boot partition;

loading a virtual device driver, the virtual device driver being configured to reference a user selected partition serial number in the signature sector; and modify a drive control block (DCB) of one of the original boot partition and the backup partition which is not the user selected boot partition.

8. A method for hiding a partition of a single drive connected to a computer as recited in claim 6, further comprising:

updating the operating system with information regarding the modified drive control block (DCB).

9. A method for hiding a partition of a single drive connected to a computer as recited in claim 6, further comprising:

mapping drive letters associated with the single drive so that the hidden partition does not offset a sequential drive letter order.

10. A method for hiding a partition of a single drive connected to a computer as recited in claim 6, further comprising:

generating a selection window requesting user selection of either the original boot partition or the backup partition for the booting.

11. A computer readable media having program instructions for selecting a boot partition from a single drive of a computer, the computer readable media comprising:

program instructions for receiving a boot request;

program instructions for accessing a signature sector of the single drive to ascertain a first serial number for a first boot partition and a second serial number for a second boot partition;

program instructions for scanning the single drive to identify the first boot partition using the first serial number and identify the second boot partition using the second serial number;

program instructions for generating a selection window requesting user selection of either the first boot partition or the second boot partition;

program instructions for modifying a boot flag of the single drive in response to the user selection, the modifying of the boot flag being configured to identify one of the first boot partition and the second boot partition as a partition containing an operating system for booting the computer;

program instructions for hiding a non-selected partition, the non-selected partition being one of the first boot partition and the second boot partition; and program instructions for modifying a drive control block (DCB) of the non-selected partition to prevent display of a drive letter for the non-selected partition.

12. A computer readable media having program instructions for selecting a boot partition from a single drive of a computer as recited in claim 11, further comprising:

program instructions for mapping drive letters of the single drive to change a second drive letter of the second boot partition to a first drive letter associated with the first boot partition, the mapping occurring when the second boot partition is selected as the partition containing the operating system for booting the computer.

13. A computer readable media having program instructions for selecting a boot partition from a single drive of a computer as recited in claim 11, wherein the hiding of the non-selected partition further includes, loading a virtual device driver, the virtual device driver being configured to reference a user selected partition serial number.

14. A computer readable media having program instructions for selecting a boot partition from a single drive of a computer as recited in claim 11, further comprising:

program instructions for informing the operating system of the modification to the drive control block (DCB) without rebooting the computer.

\* \* \* \* \*